A. K. HENRIKSON.
PITCHFORK ATTACHMENT.
APPLICATION FILED NOV. 29, 1915.
1,236,932.
Patented Aug. 14, 1917.
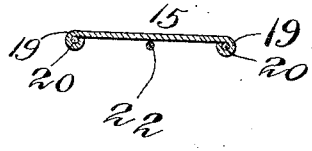
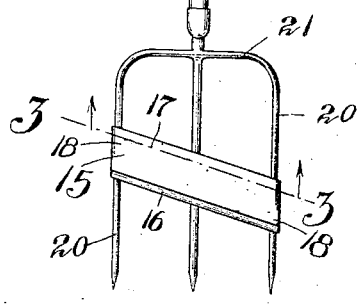
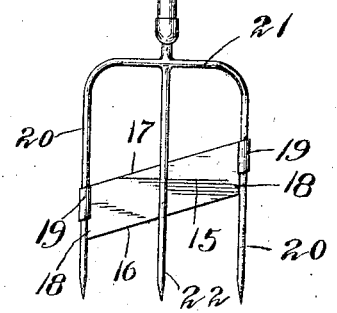
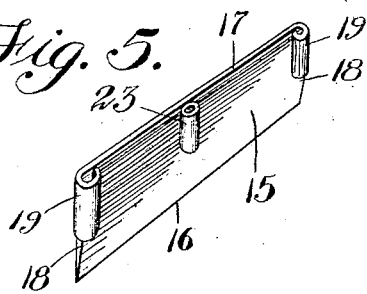
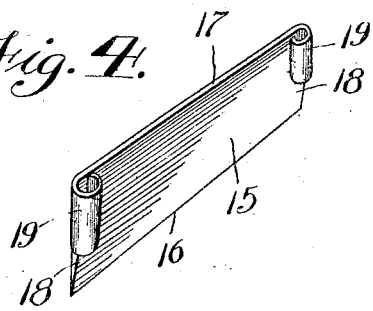
Inventor
A. K. Henrikson.
By Victor J. Evans
Attorney
Witnesses

UNITED STATES PATENT OFFICE.

ALBERT K. HENRIKSON, OF KEYES, CALIFORNIA.

PITCHFORK ATTACHMENT.

1,236,932. Specification of Letters Patent. Patented Aug. 14, 1917.

Application filed November 29, 1915. Serial No. 64,073.

*To all whom it may concern:*

Be it known that I, ALBERT K. HENRIKSON, a citizen of the United States, residing at Keyes, in the county of Stanislaus and State of California, have invented new and useful Improvements in Pitchfork Attachments, of which the following is a specification.

This invention relates to an improved cutting attachment for pitchforks, and it has for its object to produce a simple and effective cutting member of improved construction which may be readily attached or applied to any ordinary pitchfork for the purpose of cutting weeds, vines and the like and assisting in bunching the same and for other purposes.

A further object of the invention is to produce a simple and improved cutting member having tapered means consisting of sleeves whereby it may be detachably mounted on the tines of a fork.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—

Figure 1 is a front view of a pitchfork to which the improved cutting member has been applied.

Fig. 2 is a rear view of the same.

Fig. 3 is a sectional view taken on the line 3—3 in Fig. 1.

Fig. 4 is a perspective view showing the cutting member detached.

Fig. 5 is a perspective view showing a slightly modified construction of the cutting member.

Corresponding parts in the several figures are denoted by like characters of reference.

The knife blade or cutting member 15 is of rhomboidal shape so that the front cutting edge 16 and the back or blunt edge 17 will be disposed obliquely with reference to the ends 18. At each end is provided a sleeve 19 which is formed by bending or coiling a projecting end portion of the blade adjacent to the back 17 thereof, the sharp edged portion of the blade projecting materially in advance of said sleeves so that the cutting function of the edge portion 16, at the extreme ends thereof, will be unimpaired by said sleeves. The cutting edge of the blade may also be conveniently sharpened owing to the fact that the sleeves are located materially to the rearward of said cutting edge. The blade may be of any desired dimensions, causing the sleeves to be suitably spaced apart according to the dimensions of the fork to which it is to be applied. In practice, the sleeves of the cutting member are slid upon the outermost tines 20 of the fork 21 which may be of any desired shape and construction. The blade being thus applied will be obliquely disposed with reference to the points of the tines or prongs, and it will be supported intermediate its ends by the intermediate tine or tines of the prong, if any are present. One such intermediate tine has, however, been shown at 22.

Under the construction shown in Fig. 5 the blade is provided on the rear face and intermediate the ends thereof with an auxiliary sleeve 23 which may be engaged with the intermediate tine 22 of the fork, it being understood that when the fork has more than one intermediate tine, additional sleeves may be used. Ordinarily, however, the two terminal sleeves will be found sufficient for the purposes of the invention.

The improved blade or cutting member may be readily applied to the fork for which it is designed by simply slipping the tines through the sleeves, the latter being precisely of sufficient resiliency to grip the tines tenaciously so that loss or displacement will be practically impossible. The fork when used with the improved blade or cutting member may be advantageously used for cutting the vines of peas, beans and other crops which may then be bunched by means of the fork. The implement may also be utilized as a weed cutter and for other purposes which will suggest themselves.

Having thus described the invention, what is claimed as new, is:—

1. The combination with a fork having substantially parallel tines, of an elongated blade of rhomboidal shape having longitudinal cutting edge, said blade being provided at the sides thereof with terminal coils forming sleeves slidably and frictionally engaging some of the tines of the fork, said sleeves being positioned materially to the rearward of the cutting edge.

2. The combination with a fork having substantially parallel tines of a cutting attachment consisting of an elongated blade of rhomboidal shape having terminal coils forming sleeves slidably and frictionally engaging some of the tines, said blade being provided on the under side thereof with an additional sleeve slidably engaging an intermediate tine of the fork.

In testimony whereof I affix my signature in presence of two witnesses.

ALBERT K. HENRIKSON.

Witnesses:
AXEL HENDRICKSON,
HANNA HENDRICKSON.

Copies of this patent may be obtained for five cents each, by addressing the "Commissioner of Patents, Washington, D. C."